United States Patent
Xing et al.

(10) Patent No.: US 6,790,557 B2
(45) Date of Patent: Sep. 14, 2004

(54) LI-ION AND/OR LI-ION POLYMER BATTERY WITH SHIELDED LEADS

(75) Inventors: Xuekun Xing, Richmond Heights, OH (US); Jeffrey M. Smith, Hinckley, OH (US)

(73) Assignee: NGK Spark Plug Co., Ltd. (JP)

( * ) Notice: Subject to any disclaimer, the term of this patent is extended or adjusted under 35 U.S.C. 154(b) by 232 days.

(21) Appl. No.: 10/225,063

(22) Filed: Aug. 21, 2002

(65) Prior Publication Data

US 2004/0081890 A1 Apr. 29, 2004

Related U.S. Application Data

(60) Division of application No. 09/778,699, filed on Feb. 7, 2001, now Pat. No. 6,475,674, which is a continuation-in-part of application No. 09/501,197, filed on Feb. 10, 2000, now Pat. No. 6,403,262.

(51) Int. Cl.$^7$ ............................. H01M 4/70; H01M 4/74
(52) U.S. Cl. ..................... 429/211; 429/241; 429/174; 429/185
(58) Field of Search ............................ 429/211, 241, 429/174, 185

(56) References Cited

U.S. PATENT DOCUMENTS

| | | | |
|---|---|---|---|
| 5,326,653 A | 7/1994 | Chang | 429/162 |
| RE35,746 E | 3/1998 | Lake | 429/127 |
| 6,004,693 A | 12/1999 | Fukuda et al. | 429/176 |
| 6,013,388 A | 1/2000 | Stadnick et al. | 429/120 |
| 6,071,638 A | 6/2000 | Fradin | 429/94 |
| 6,180,284 B1 | 1/2001 | Shah et al. | 429/218.1 |
| 6,242,128 B1 | 6/2001 | Tura et al. | 429/161 |
| 6,245,456 B1 | 6/2001 | Fukuda et al. | 429/122 |
| 6,403,262 B1 * | 6/2002 | Xing et al. | 429/231.95 |
| 6,475,674 B2 * | 11/2002 | Xing et al. | 429/231.95 |

FOREIGN PATENT DOCUMENTS

| | | | | |
|---|---|---|---|---|
| CA | 2302980 | * | 3/2000 | H01M/2/06 |
| JP | 01-279998 | * | 11/1989 | H01M/2/16 |
| JP | 2003132875 | * | 5/2003 | H01M/2/34 |
| JP | 2003187874 | * | 7/2003 | H01M/10/04 |

* cited by examiner

Primary Examiner—Mark Ruthkosky
(74) Attorney, Agent, or Firm—Kusner & Jaffe

(57) ABSTRACT

A battery section for a Li-ion and/or Li-ion polymer cell, comprised of:

a planar metal mesh layer having a body portion and a coplanar tab portion defining a battery lead extending from one edge of the mesh layer;

electrode film laminated to opposite surfaces of the body portion of the metal mesh layer; and a protective layer on at least one side of the tab, the protective layer having a portion of the tab that is adjacent to the electrode film, the protective layer comprised of an outer polymer layer and an inner adhesive layer adhering the outer polymer layer to the portion of the tab.

6 Claims, 6 Drawing Sheets

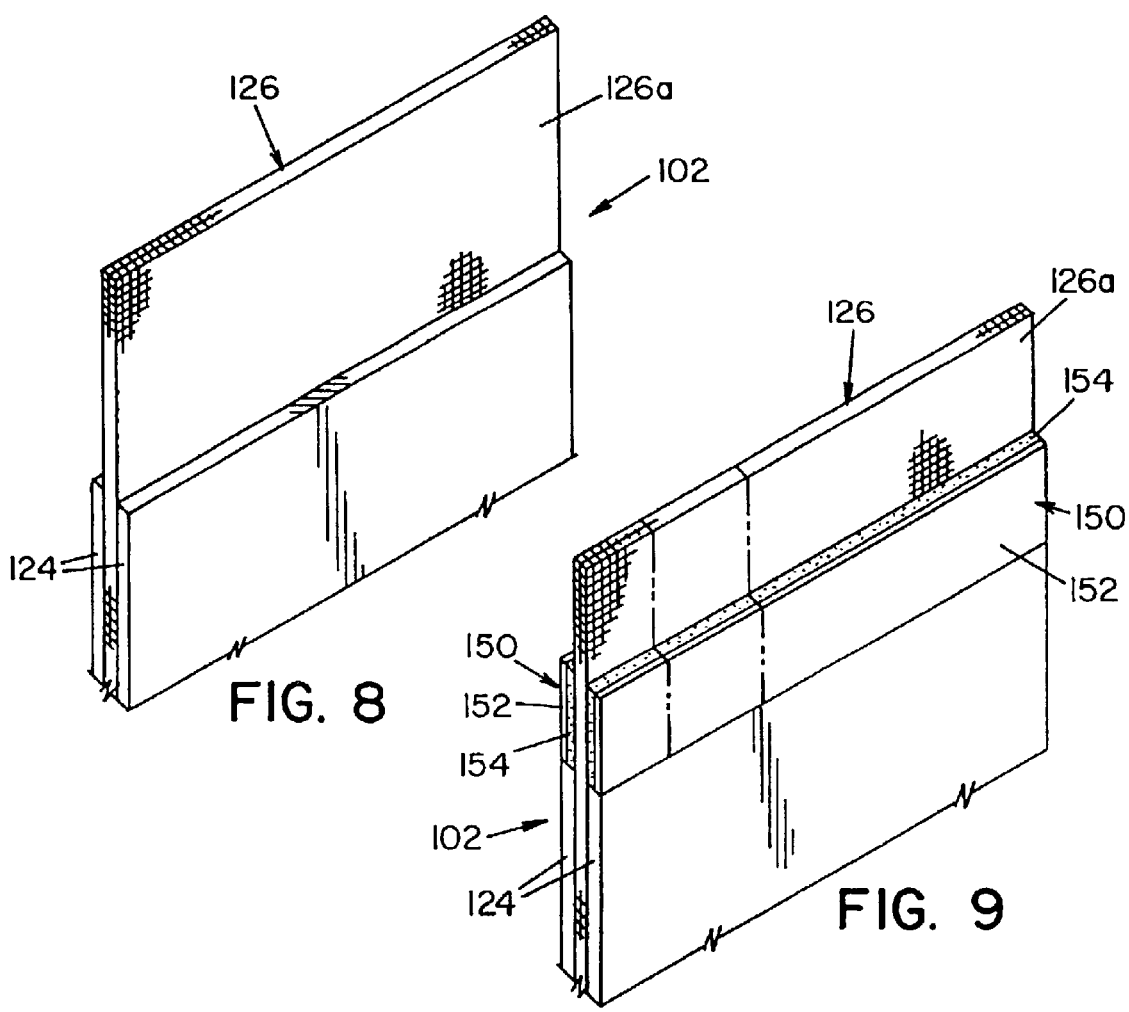
FIG. 8
FIG. 9
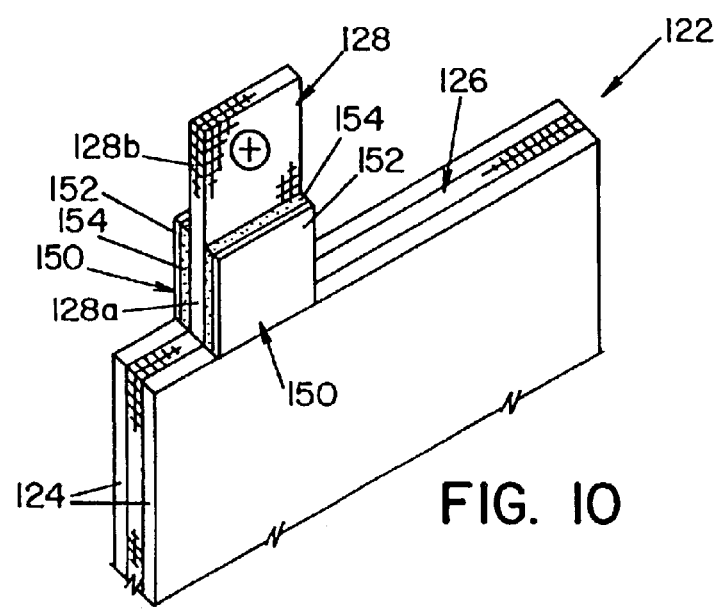
FIG. 10

LI-ION AND/OR LI-ION POLYMER BATTERY WITH SHIELDED LEADS

This application is a divisional of U.S. patent application Ser. No. 09/778,699 filed on Feb. 7, 2001, now U.S. Pat. No. 6,475,674 which is a continuation-in-part of U.S. patent application Ser. No. 09/501,197 filed on Feb. 10, 2000 now U.S. Pat. No. 6,403,262.

FIELD OF THE INVENTION

The present invention relates generally to Li-ion and/or Li-ion polymer batteries, and more particularly, to a Li-ion and/or Li-ion polymer battery having shielded leads to reduce the likelihood of shorting.

BACKGROUND OF THE INVENTION

Broadly stated, a Li-ion and/or Li-ion polymer cell is generally comprised of an anode section, a cathode section and a separator layer that is disposed between the anode section and the cathode section. A layer of a first conductive material is disposed within or in contact with the anode section. This layer forms what is conventionally referred to as an "anode current collector." A second layer of a conductive material is disposed within or in contact to the cathode section to form a "cathode current collector." It is conventionally known to use metal screens or meshes or foils to form the aforementioned current collectors. Typically, a copper mesh is used to form the anode current collector, and an aluminum metal mesh is used to form the cathode current collector. Current collectors are typically die-cut from sheets of metal mesh, and each current collector includes a tab portion that defines a battery lead. In this respect, an anode current collector will include a tab to define a battery's negative lead and the cathode current collector will include a tab to define a battery's positive lead.

A problem with using metal mesh as a current collector is that metal burrs or shards may be formed during the die-cutting process. These burrs or shards project at angles to the plane of the current collector. In the body of the cell, these burrs or shards generally do not create a problem as the layers of metal mesh forming the respective current collectors are generally maintained separate from each other by the respective layers of material forming the cell. However, the tabs forming the electrical leads extend beyond the peripheries of the anode section, cathode section and separator layers and do create a problem of shorting, particularly in a cell having two or more cathodes. In such cells, the leads of the cathode current collectors are typically in registry with each other and are pressed together to form one positive battery lead. Specifically, the aforementioned cells are enclosed within a housing or packaging. During the fabrication process, the packaging is usually sealed along the peripheral edges of the cell, thereby forcing like leads together. In most battery designs opposite leads are offset from each other so that they will not contact each other. Like leads, such as two cathode sections, are typically forced together and joined. It is at these locations where the burrs or shards are more likely to penetrate through the separator layers and short circuit the cell by coming into contact with layers of the opposite polarity.

The present invention overcomes this problem by providing a protective layer on the leads of the current collector where the leads extend from the cell to prevent burrs or shards on the current collectors from penetrating through the separator layer.

SUMMARY OF THE INVENTION

In accordance with the present invention, there is provided a Li-ion and/or Li-ion polymer cell comprised of an anode layer, a cathode layer and a separator layer that is disposed between the anode layer and the cathode layer. A first, planar metal mesh layer is adjacent the anode layer. The first metal mesh layer has a coplanar tab extending beyond the separator layer to define a negative lead. A second, planar metal mesh layer is adjacent the cathode layer. The second metal mesh layer has a coplanar tab extending beyond the separator layer to form a positive lead. A first protective layer is applied on the coplanar tab of the first metal mesh layer. The first protective layer is disposed where the tab extends beyond the anode layer and is disposed on the surface of the tab facing the second metal mesh layer. A second protective layer is applied on the coplanar tab of the second metal mesh layer. A second protective layer is disposed where the tab extends beyond the cathode layer and is disposed on the surface of the tab facing the first metal mesh layer.

In accordance with another aspect of the present invention, there is provided a Li-ion and/or Li-ion polymer cell, comprised of a first cathode section and a second cathode section. Each cathode section has a cathode current collector in contact therewith. The cathode current collector is comprised of a sheet of metal mesh having a tab portion that extends outwardly from the sheet beyond the cathode section to form a cathode section lead. The cathode section lead from the first cathode section is disposed adjacent to the cathode section lead from the second cathode section. An anode section is disposed between the cathode sections. The anode section has an anode current collector having a tab portion that extends therefrom beyond the anode section to form an anode section lead. A separator layer is disposed between the anode section and each of the cathode sections. A protective layer is applied to the tab portion of each cathode current collector where the tab portion extends from the sheet. The protective layers are disposed between the tab portions to prevent shorts when the tab portions are pressed together to form a single positive lead.

It is an object of the present invention to provide a Li-ion and/or Li-ion polymer cell using metal mesh as current collectors.

It is another object of the present invention to provide a cell as described above that is less susceptible to failure from short-circuiting during fabrication.

Another object of the present invention is to provide a cell as described above having protective sleeves around the battery leads in the vicinity where the leads extend from the cell.

A still further object of the present invention is to provide a cell as described above having plastic tape surrounding each lead to isolate the lead from other battery components.

These and other objects and advantages will become apparent from the following description of a preferred embodiment of the invention, taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 8 is a perspective view of a laminate for use in forming a battery section, the laminate comprised of a sheet of collector material having electrode films applied to the opposite sides thereof;

FIG. 9 is a perspective view of the laminate shown in FIG. 8 with strips of protective material adjacent to the electrode films;

FIG. 10 is a perspective view of a battery section die-cut, i.e., stamped, from the laminate shown in FIG. 9;

DETAILED DESCRIPTION OF PREFERRED EMBODIMENT

Figure 1:
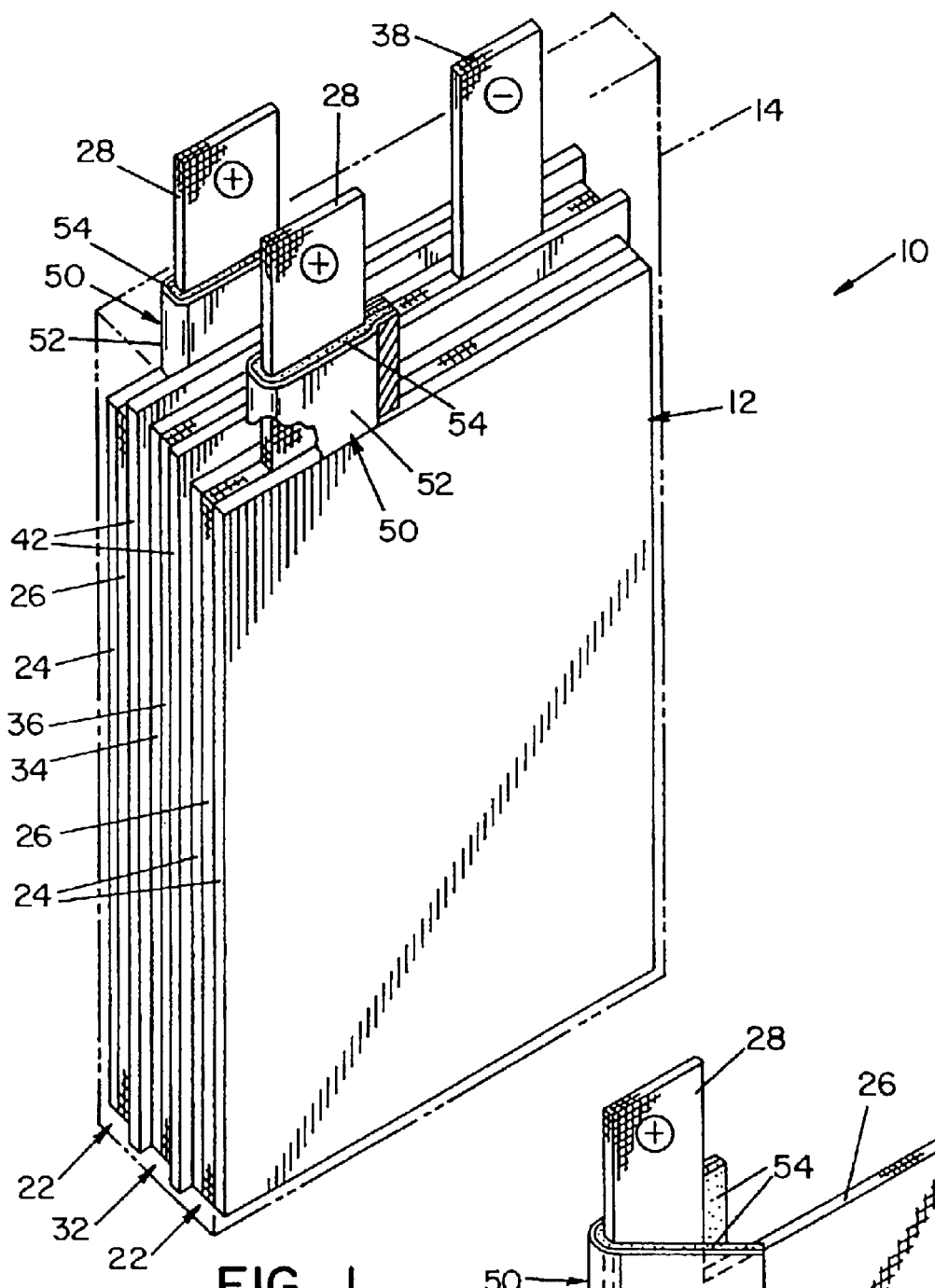
FIG. 1 is a perspective view of a cell illustrating a preferred embodiment of the present invention.

Referring now to the drawings wherein the showings are for the purpose of illustrating a preferred embodiment of the invention only, and not for the purpose of limiting same, FIG. 1 shows a battery 10 illustrating a preferred embodiment of the present invention. Battery 10 is formed of a cell 12 contained within a package 14 (shown in phantom in the drawings) that is formed of a flexible laminate material. Cell 12 is preferably a lithium-based electrochemical cell. Cell 12 may be a primary (non-rechargeable) cell or a secondary (rechargeable) cell.

In the embodiment shown, cell 12 is a "bi-cell" comprised of two cathode sections 22 and an anode section 32. Each cathode section 22 is comprised of two layers 24 of a cathode film. The film-forming cathode layer 24 is preferably comprised of a lithiated metal oxide active material, a conductive material and a binder material. A current collector 26 formed of a metal screen or mesh is provided between each cathode layer 24. Each current collector 26 includes an outward extending tab or strip 28.

Anode section 32 is comprised of two layers of an anode film having a current collector 36 disposed therebetween. The film-forming anode layers 34 are preferably comprised of a carbonaceous active material, a conductive material and a binder material. Current collector 36 includes an outward extending tab or strip 38 that defines the negative lead of battery 10.

Between anode section 32 and each cathode section 22, a separator film 42 is disposed. Separator film layer 42 is preferably formed of a polymeric matrix containing ionically conductive electrolyte.

Each cathode layer 24 preferably has a thickness of about 50 μm to about 300 μm, preferably about 100 μm to about 200 μm. Each anode layer 34 has a thickness of about 50 μm to about 300 μm, preferably about 100 μm to about 200 μm. Each separator layer 42 has a thickness of about 10 μm to about 75 μm, preferably about 15 μm to about 35 μm. Current collectors 26, 36 are preferably formed of a metal mesh or screen having a thickness of about 25 μm to about 50 μm. The overall thickness of cell 12 is about 800 μm or less, and preferably about 500 μm or less.

Figure 2:
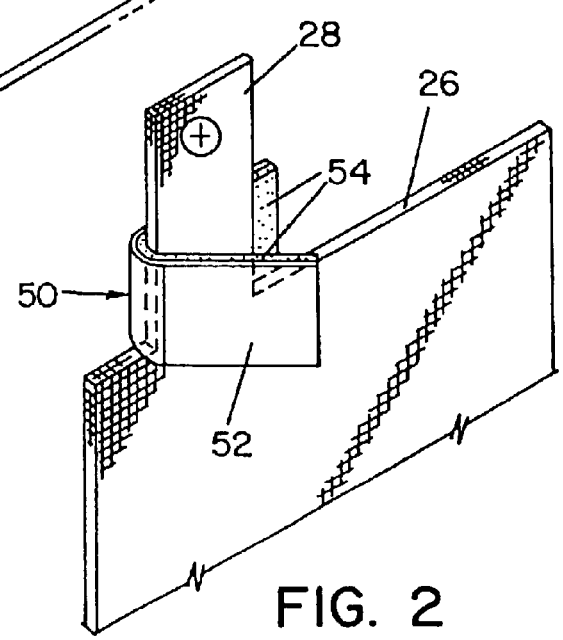
FIG. 2 is a perspective view of a current collector from the cell shown in FIG. 1, showing a protective layer surrounding the lead extending from the current collector.
Figure 3:
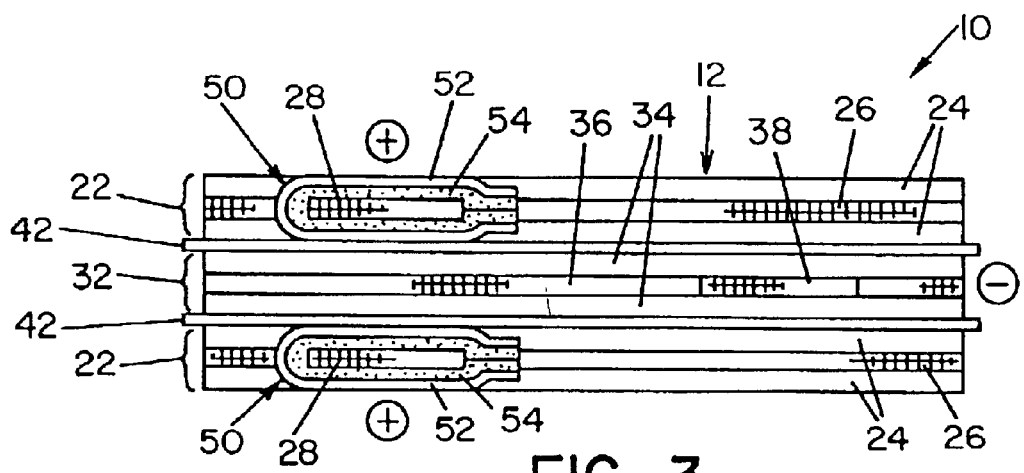
FIG. 3 is a top plan view of the cell shown in FIG. 1.
Figure 4:
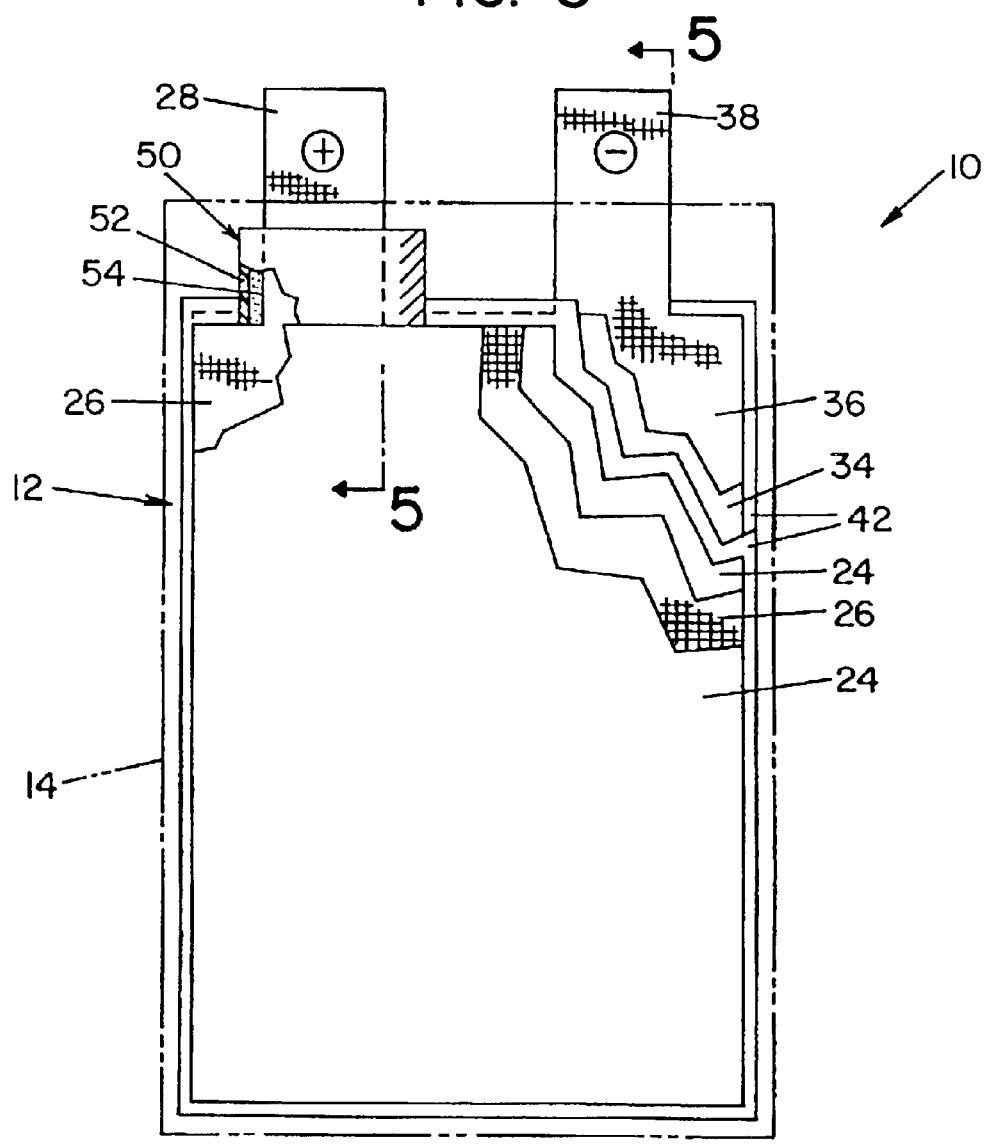
FIG. 4 is a front elevational view of the cell shown in FIG. 1.
Figure 5:
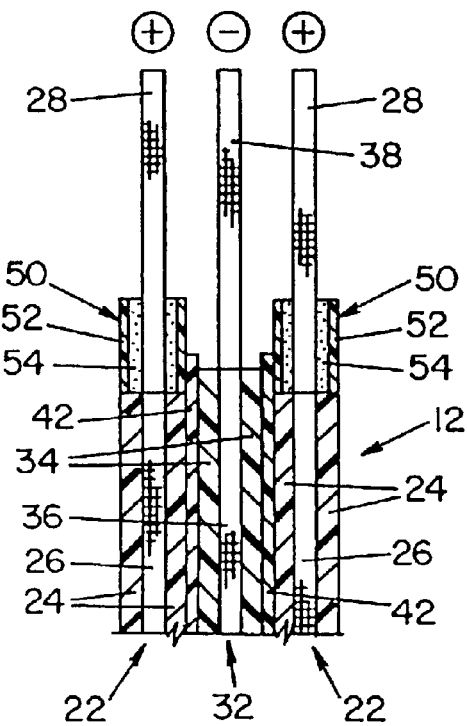
FIG. 5 is a partial, sectional view taken along lines 5—5 of FIG. 4.
Figure 7:
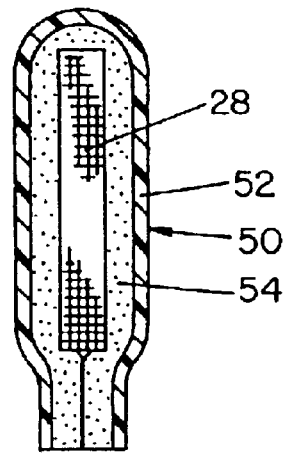
FIG. 7 is an enlarged sectional view taken along lines 7—7 of FIG. 6.
Figure 6:
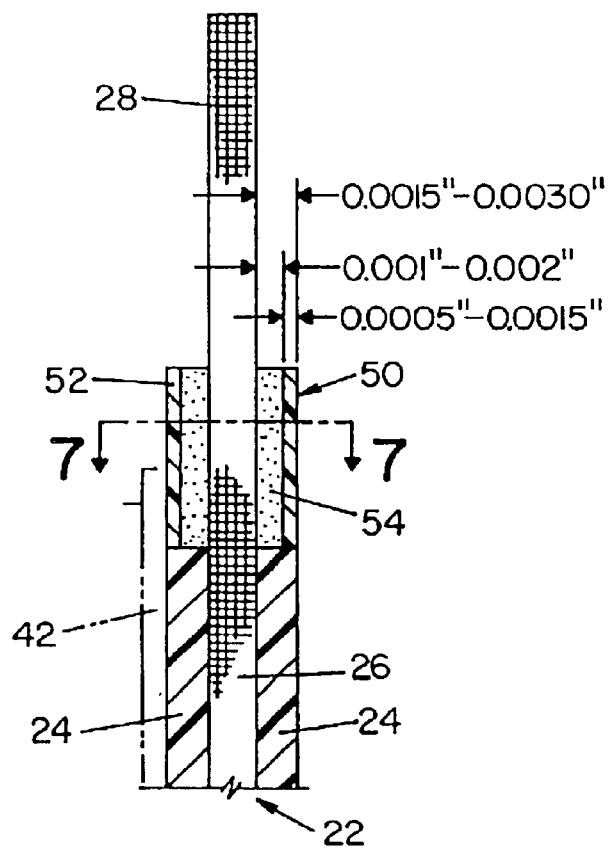
FIG. 6 is an enlarged fragmentary section of the area shown in FIG. 5.

As illustrated in FIG. 1, strips 28 of cathode current collectors 26 are disposed in registry with each other to be joined together to define a single positive lead of battery 10. In accordance with the present invention, a protective sleeve 50 is wrapped around tabs 28 of cathode current collectors 26. As illustrated in FIG. 2, protective sleeve 50 is disposed about tab 28 at the location where tab 28 extends from current collector 26. In this respect, a portion of protective sleeve 50 is disposed adjacent a portion of separator film 42, as best seen in FIG. 5. Protective sleeve 50 may be formed of two separate strips of material applied to the opposite sides of tab 28, but more preferably is comprised of a single strip of material that is wrapped around tab 28, as illustrated in FIGS. 2 and 7. In accordance with the present invention, protective sleeve 50 is comprised of an outer polymer layer 52 and an inner adhesive layer 54. Outer layer 52 is preferably formed of a tough, thin polymer material having high dielectric properties and that is inert to the components forming cell 12. Various plastic tapes find advantageous application in forming outer layer 52. Such plastic materials may include polyimide, polyester and the like. Polymeric outer layer 52 preferably has a thickness of about 0.0005 inches to about 0.0015 inches. The width of protective layer 52 is based upon the battery design. As indicated above, at least a portion of protective layer 52 will overlay separator layers 42.

Adhesive layer 54 is preferably formed of an electrically non-conductive, thermosetting polymer, sealing material. An adhesive material, such as silicone, finds advantageous use as adhesive layer 54 in that this material is stable in the environment of a lithium ion polymer battery. Other adhesive materials such as rubber or resin may also be used. The thickness of adhesive layer 54 is about 0.001 inches to about 0.002 inches. The total thickness of protective layer 50 is preferably about 0.0015 inches to about 0.0030 inches.

In accordance with the present invention, protective layer 50 may be applied manually or by automatic or semi-automatic operations. In this respect, protective layer 50 may be applied to current collectors 26 prior to their assembly in cell 12.

FIGS. 8–10 illustrate a method of forming a battery section having a protective lead. The method is applicable to forming either a cathode section or an anode section that is similar to cathode section 22 and anode section 32, as heretofore described. The method shall be described with respect to forming a cathode section 122. However, as will be appreciated from a further reading of the specification, the method also finds advantageous application in forming anode section 132. In accordance with the present invention, a laminate 102 is formed by laminating a sheet of a current collector material 126 with layers 124 of cathode film. Layer 126 of collector material is preferably a metal screen, mesh or a perforated sheet having a thickness of about 25 μm to about 50 μm. Layers 124 are preferably films comprised of a lithiated metal oxide active material, conductive material and a binder material. (If an anode battery section is to be formed, layers 124 are preferably films comprised of a carbonaceous active material, conductive material and a binder material). As shown in FIG. 8, film layers 124 are dimensioned such that when layers 124 are applied to layer 126, a portion 126a of mesh 126 extends beyond the edges of film layers 124.

Following lamination of film layers 124 to collector material 126, a strip 150 of protective material is then applied to each side of portion 126a of layer 126, as shown in FIG. 9. Protective strips 150 are positioned such that one edge of each strip 150 is adjacent to the edge of cathode film layers 124. As shown in the drawings, protective strips 150 are dimensioned such that only part of exposed portion 126a of layer 126 is covered. Protective strips 150 are preferably comprised of an outer layer 152 of a polymeric material and an inner layer 154 of an adhesive material. Adhesive layer 154 is similar to that previously described. In this respect, adhesive layer 154 is preferably formed of a non-conductive, thermosetting polymeric sealing material. A silicone material finds advantageous use as adhesive layer 154 in that the material is stable in an environment of a lithium-ion battery. Rubber or resin may also be used. Outer layer 154 is preferably formed of a tough, thin polymer material having high dielectric properties and that is inert to the components of cell 112. Tapes such as polyimide and polyester find advantageous application in forming the outer layer.

The respective layers 152, 154 are similar to those previously described, and have thicknesses as heretofore described. With protective strip 150 applied to battery laminate 102, a composite structure, best seen in FIG. 9, is formed. From laminate 102, a battery section 122 is formed by die cutting, i.e., stamping, laminate 102 so as to produce a battery lead 128, best seen in FIG. 10. Lead 128 includes a first intermediate portion 128a that is covered by protective strip 150 and an outward, end portion 128b that is comprised of exposed layer 126.

Figure 11:
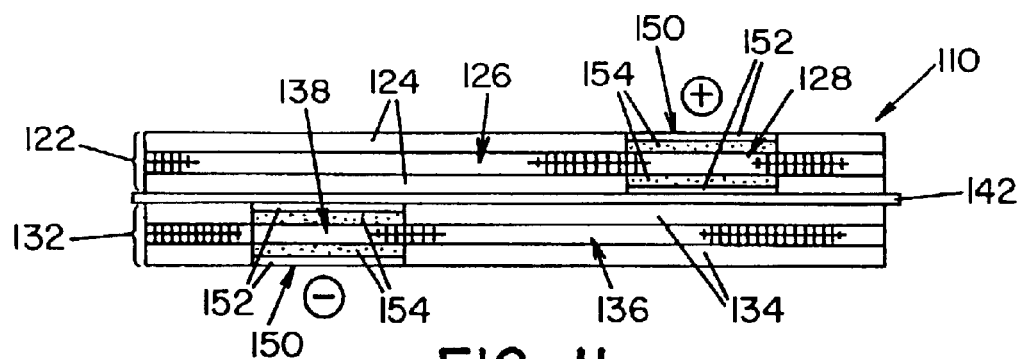
FIG. 11 is a top, plan view of a cell showing the tabs of battery sections formed in accordance with the steps shown in FIGS. 8–10.
Figure 12:
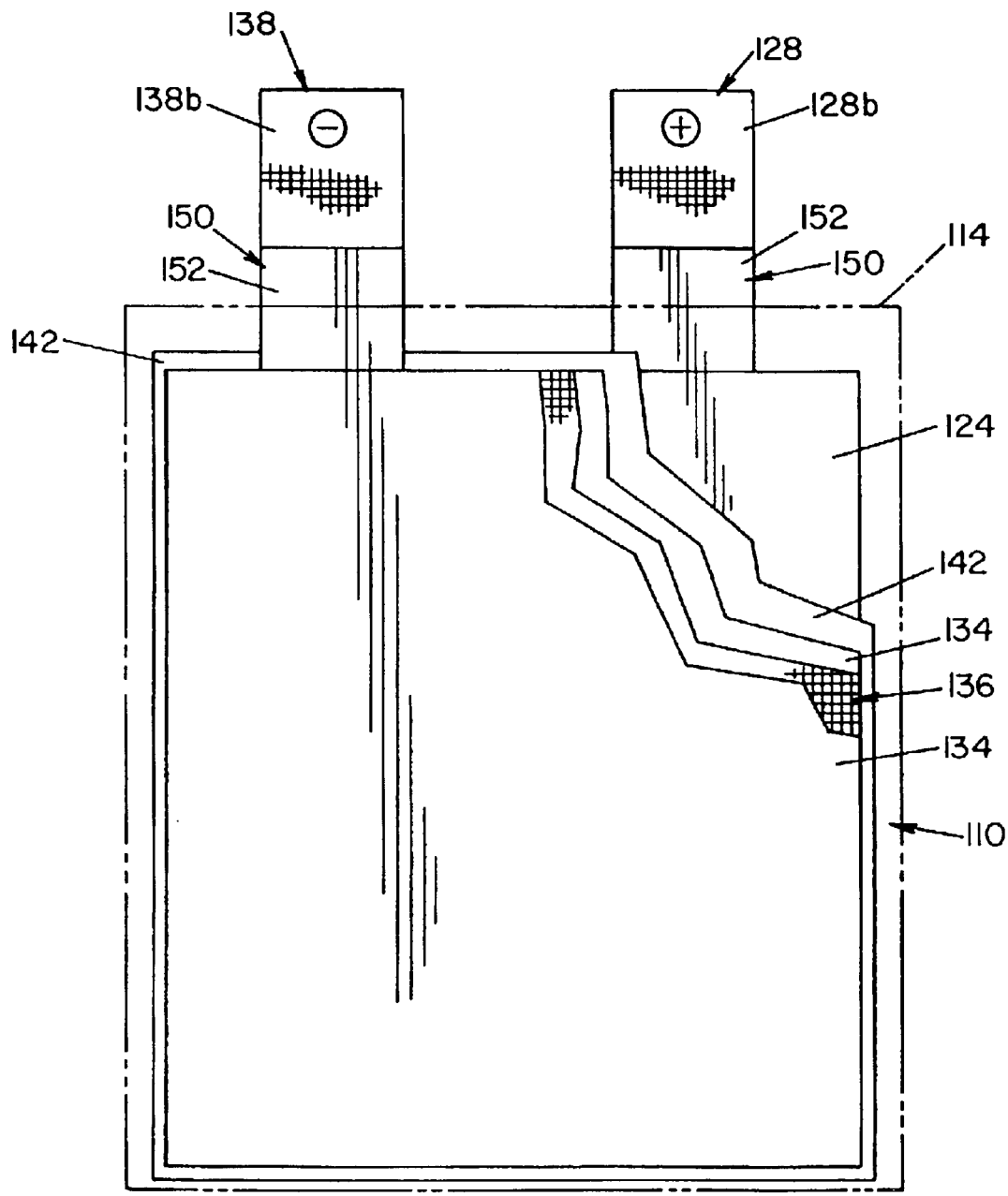
FIG. 12 is a partially sectioned, elevational view of the cell shown in FIG. 11.

As indicated above, the process as heretofore described may also be used to form an anode battery section 132. A cathode section 122 and an anode section 132 may then be laminated together with a separator 142 to form a cell 110, as best seen in FIGS. 11 and 12. Cell 110 is what is conventionally referred to as a "single cell" and has a shielded cathode lead 128 and a shielded anode lead 138. Cell 110 is adapted to be placed within a package 114, shown in phantom in FIG. 12. Package 114 is adapted to be sealed about the periphery of cell 114 in a manner wherein the edge of package 114 extends over protective strip 50 on leads 128, 138. When heat and pressure are applied to seal package 114, protective strips 150 on leads 128, 138 prevent shorting or battery discharge by preventing shards or burrs on metal mesh layer 126 from penetrating into contact with a conductive surface.

Figure 13:
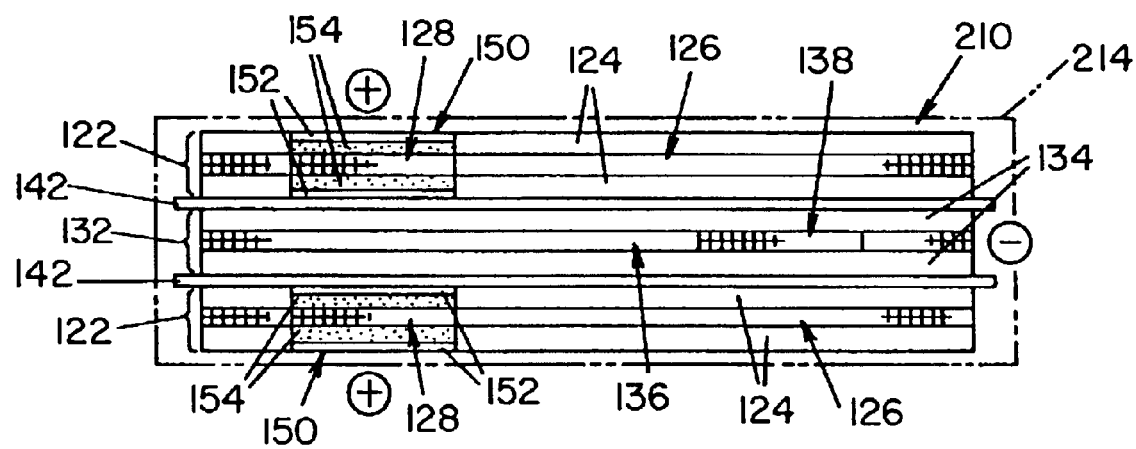
FIG. 13 is a top, plan view of a bi-cell showing battery sections having protective layers, illustrated in the alternate embodiment of the present invention.

FIG. 13 shows a "bi-cell" 210 similar to that shown in FIG. 1, wherein cathode sections 122 with protective strips 150 on leads 128 thereof are formed by a stamping process as heretofore described. As in the embodiment shown in FIG. 1, applying protective strips 150 onto cathode leads 128 reduces the likelihood of shorting of cathode lead 128 when bi-cell 210 is inserted within a package 214 and the edges of package 214 are sealed using heat and pressure.

FIGS. 8–10 thus illustrate an alternate method for protecting leads of a battery other than the wrapping method illustrated in FIGS. 1–7. FIGS. 8–10 further illustrate a method of forming battery sections for a Li-ion or Li-ion polymer battery. In this respect, FIGS. 8–10 illustrate a method of forming a battery section 122 with protected leads 128 from a single sheet laminate 102 of collector material 126 and cathode film 124. As will be appreciated by those skilled in the art, the method disclosed in FIGS. 8–10 lends itself to a generally continuous process, wherein a generally continuous strip or web of collector material 126 is moved along a predetermined path, and then laminated to generally continuous strips of cathode film layers 124 that intersect the path on opposite sides of collector material 126. Heat and pressure may be applied to the moving layer to laminate them together. Protective strips 150 may then be applied from a roll in a generally continuous fashion, thereby producing a generally continuous strip of the laminate structure shown in FIG. 9. The generally continuous laminate structure could then be fed into a stamping press to repeatedly stamp, i.e., die-cut, battery sections therefrom, each battery section having a field lead thereon.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, cell 12 as heretofore described, disclosed cathode section 22 and anode section 32 as being formed from layers of generally solid material. It shall be appreciated by those skilled in the art that cathode sections 22 may be formed of a single layer of a viscous material having cathode current collectors embedded therein. Likewise, anode section 32 may be formed of a single layer of a viscous material having anode current collector 36 embedded therein. It is intended that all such modifications and alterations be included insofar as they come within the scope of the invention as claimed or the equivalents thereof.

Having described the invention, the following is claimed:

1. A battery section for a Li-ion and/or Li-ion polymer cell, comprised of:

a planar metal mesh layer having a body portion and a coplanar tab portion defining a battery lead extending from one edge of said mesh layer;

electrode film laminated to opposite surfaces of said body portion of said metal mesh layer; and a protective layer on at least one side of said tab, said protective layer having a portion of said tab that is adjacent to said electrode film, said protective layer comprised of an outer polymer layer and an inner adhesive layer adhering said outer polymer layer to said portion of said tab.

2. A battery section as defined in claim 1, wherein said protective layer is on both sides of said tab.

3. A battery section as defined in claim 2, wherein said outer polymer layer has a thickness between about 0.0005 inches and about 0.0015 inches.

4. A battery section as defined in claim 3, wherein said outer polymer layer is comprised of polyimide.

5. A battery section as defined in claim 3, wherein said outer polymer layer is comprised of polyester.

6. A battery section as defined in claim 4, wherein said inner adhesive layer is comprised of silicone.

* * * * *